(12) United States Patent
Kumabe et al.

(10) Patent No.: US 7,394,356 B2
(45) Date of Patent: Jul. 1, 2008

(54) INFORMATION PRESENTING APPARATUS AND METHOD

(75) Inventors: Hajime Kumabe, Kariya (JP); Naohiko Tsuru, Handa (JP); Takao Nishimura, Nagoya (JP)

(73) Assignee: Denso Corporation, Kariya (JP)

( * ) Notice: Subject to any disclaimer, the term of this patent is extended or adjusted under 35 U.S.C. 154(b) by 248 days.

(21) Appl. No.: 11/287,709

(22) Filed: Nov. 28, 2005

(65) Prior Publication Data

US 2006/0097858 A1 May 11, 2006

Related U.S. Application Data

(63) Continuation-in-part of application No. 11/232,914, filed on Sep. 23, 2005, now abandoned.

(30) Foreign Application Priority Data

Oct. 27, 2004 (JP) ............................. 2004-312849

(51) Int. Cl.
  *B60Q 1/00* (2006.01)
  *G06F 17/20* (2006.01)
  *H04N 7/18* (2006.01)
(52) U.S. Cl. ........................ 340/436; 340/438; 701/301; 348/148
(58) Field of Classification Search ................. 340/438
  See application file for complete search history.

(56) References Cited

U.S. PATENT DOCUMENTS

| 5,719,568 | A  | * | 2/1998  | Adams .......................... 340/961 |
| 6,198,386 | B1 | * | 3/2001  | White, II ...................... 340/435 |
| 6,272,431 | B1 | * | 8/2001  | Zamojdo et al. ............. 701/211 |
| RE37,610  | E  | * | 3/2002  | Tsuchiya et al. ............. 340/435 |
| 6,486,798 | B2 | * | 11/2002 | Rast ............................ 340/961 |
| 6,538,622 | B1 | * | 3/2003  | Kojima et al. .................. 345/7 |
| 6,711,473 | B2 |   | 3/2004  | Shimazaki et al. |
| 6,744,380 | B2 | * | 6/2004  | Imanishi et al. ............. 340/937 |
| 6,963,293 | B1 | * | 11/2005 | Rast ............................ 340/981 |
| 7,167,779 | B2 | * | 1/2007  | Kashiwada et al. ............ 701/1 |
| 7,222,009 | B2 | * | 5/2007  | Hijikata et al. ................ 701/41 |
| 2002/0198634 | A1 |   | 12/2002 | Shimazaki et al. |
| 2003/0128106 | A1 | * | 7/2003  | Ross .......................... 340/435 |
| 2003/0146827 | A1 | * | 8/2003  | Koike ......................... 340/435 |
| 2003/0220728 | A1 | * | 11/2003 | Rao et al. ...................... 701/45 |

FOREIGN PATENT DOCUMENTS

| JP | 02-231245   |   | 9/1990  |
| JP | 06-255399   |   | 9/1994  |
| JP | 2003-291688 | * | 10/2003 |

OTHER PUBLICATIONS

Abstract for EP 1270330 published Jan. 2, 2003.

* cited by examiner

*Primary Examiner*—George A Bugg
*Assistant Examiner*—Eric M. Blount
(74) *Attorney, Agent, or Firm*—Harness, Dickey & Pierce, PLC

(57) ABSTRACT

An information presenting method and apparatus for a vehicle which may process display information based on a predicted direction of movement of the vehicle, detect an object near the vehicle, determine whether the object is a dangerous object, and control a presentation direction so that the display information is a direction of movement of the vehicle during operation, and if the object is a dangerous object, the information presenting method or apparatus moves the presentation direction from the direction of movement of the vehicle to a direction of the object and presents the display information of areas outside the vehicle.

12 Claims, 3 Drawing Sheets

LL  LR
RUN ANTICIPATION TRACK

DANGEROUS OBJECT    LT   LT

US 7,394,356 B2

INFORMATION PRESENTING APPARATUS AND METHOD

PRIORITY STATEMENT

The present application hereby claims priority under 35 U.S.C. §119 on Japanese patent application No. 2004-312849, filed on Oct. 27, 2004, the entire contents of which is hereby incorporated herein by reference. Further, the present application claims priority under 35 U.S.C. §120 and is a Continuation-in-Part of U.S. patent application Ser. No. 11/232,914 entitled INFORMATION PROVIDING DEVICE FOR VEHICLE, filed Sep. 23, 2005 (claiming priority on JP 2004-312849, filed on Oct. 27, 2004), the entire contents of which is hereby incorporated herein by reference.

BACKGROUND OF THE INVENTION

1. Field of the Invention

Example embodiments of the present invention relate to an information presenting apparatus and method for a vehicle, for example, an automobile.

2. Description of the Related Art

JP6-255399A illustrates a prior art technique for providing an alarm to a vehicle driver, to alert the vehicle driver to the existence of a dangerous object. As taught in JP6-255399A, the alarm may include warning information identifying the dangerous object displayed on the windshield of the vehicle. Displaying warning information on the windshield essentially "spotlights" the dangerous object for the vehicle driver.

In practice, when warning information is displayed on the windshield, the vehicle driver may divert his focus from the road to look at the warning information and appreciate the presence of the dangerous object. Then, the vehicle driver may focus on the dangerous object itself in order to ascertain the distance to the dangerous object.

Thus, when a method of displaying warning information on a windshield is adopted, the vehicle driver may be required to perform a focal adjustment from the road to the dangerous object displayed on the windshield and/or from the dangerous object displayed on the windshield to the actual dangerous object.

Techniques, such as the one described in JP6-255399A, initially display the information on the windshield for the first time when the dangerous object is detected. Therefore, a driver may not necessarily react to the newly displayed information. Because the vehicle driver's focus is usually in the direction of movement of the vehicle, when the information on the windshield is first displayed, the vehicle driver may overlook the information.

Thus, in the prior art, a vehicle driver may be required to perform a focal adjustment to a dangerous object displayed on the windshield. The vehicle driver may overlook the newly displayed information, be unable to react to the newly displayed information, and/or be distracted from the actual dangerous object by the newly displayed information.

SUMMARY OF THE INVENTION

Example embodiments of the present invention are directed to an information presenting apparatus and method which show vision information representing a run anticipation track of the vehicle, and if dangerous object is detected, the direction of the vision information is shifted from the run anticipation track to the dangerous object.

Example embodiments of the present invention may permit a driver to more easily recognize a dangerous object. Example embodiments of the present invention may reduce a delay time for a driver to look at a dangerous object. Example embodiments of the present invention may permit the driver to more easily make a focal adjustment. Example embodiments of the present invention may reduce the chance of oversight by the driver.

In example embodiments of the present invention, displayed information is presented to illustrate a direction of movement of the vehicle during operation. As a result, the vehicle driver's focus and attention is directed to a direction of movement of vehicle suitable for operation. A focus of a vehicle driver's may also be adjusted to a position where the information is displayed.

In example embodiments of the present invention, displayed information is also presented to illustrate when a dangerous object is in the vicinity of the vehicle. When a dangerous object is in the vicinity of the vehicle, the displayed information is presented to illustrate the dangerous object in the direction of the dangerous object.

As a result, a vehicle driver who is focused on a direction of movement of the vehicle will see the movement of the presentation direction of the displayed information. As a result, a vehicle driver may react to movement of the presentation direction of the displayed information quickly and the possibility of a delayed reaction (or no reaction) by the vehicle driver is reduced.

When the presentation direction of display information moves from the direction of vehicle travel to the direction of the dangerous object, the vehicle driver's focus may also change from the direction of vehicle travel to the direction of the dangerous object. As a result, the vehicle driver's focal adjustment may be relatively small.

An information presenting device for a vehicle in accordance with example embodiments of the present invention may control or reduce delay of a focus change of the vehicle driver to a dangerous object.

An information presenting device for a vehicle in accordance with example embodiments of the present invention may also reduce the possibility of a delayed reaction (or no reaction) by the vehicle driver.

An information presenting device for a vehicle in accordance with example embodiments of the present invention may also reduce the degree of focal adjustment by a vehicle driver.

In an example embodiment, the present invention is directed to an information presenting apparatus for a vehicle including a presentation device to present display information of areas outside the vehicle, a control device to control a presentation direction of said presentation device so that the display information relates to a travel direction of the vehicle during operation, an object sensing device to detect an object near the vehicle, and a determining device to determine whether the object is a dangerous object, the control device moving the presentation direction from the a travel direction of the vehicle to a direction of the object, to allow the presentation device to present display information about the object, if the determining device determines that the object is a dangerous object.

In a example embodiment, the present invention is directed to an information presenting method for a vehicle including presenting display information of areas outside the vehicle, detecting an object near the vehicle, determining whether the object is a dangerous object, moving the presentation direction from the a travel direction of the vehicle to a direction of the object, to allow the presentation device to present display information about the object, if the determining device determines that the object is a dangerous object, and controlling the presentation direction so that the display information illustrates a direction of movement of the vehicle during operation, and if the object is a dangerous object, moving the presentation direction from the direction of movement of the vehicle to a direction of the object.

In an example embodiment, the present invention is directed to an information presenting method for a vehicle including processing display information based on a predicted direction of movement of the vehicle, detecting an object near the vehicle, determining whether the object is a dangerous object, and controlling a presentation direction so that the display information is a direction of movement of the vehicle during operation, and if the object is a dangerous object, moving the presentation direction from the direction of movement of the vehicle to a direction of the object, and presenting the display information of areas outside the vehicle.

In an example embodiment, the present invention is directed to a control device for an information presenting apparatus of a vehicle including an input device to receive a plurality of inputs, including at least one surrounding vehicle input, at least one operating condition input, and at least one run condition input and a processor to detect an object near the vehicle, determine driver intention and determine a run anticipation track of the vehicle based on the at least one surrounding vehicle input, the at least one operating condition input, and the at least one run condition input. The processor may also to determine if the object is a dangerous object based on the object detected near the vehicle and the driver intention, output the run anticipation track of the vehicle, if the object near the vehicle is not a dangerous object, and output information which identifies the direction of the object, if the object near the vehicle is a dangerous object.

DETAILED DESCRIPTION OF EXAMPLE EMBODIMENTS

Figure 1:
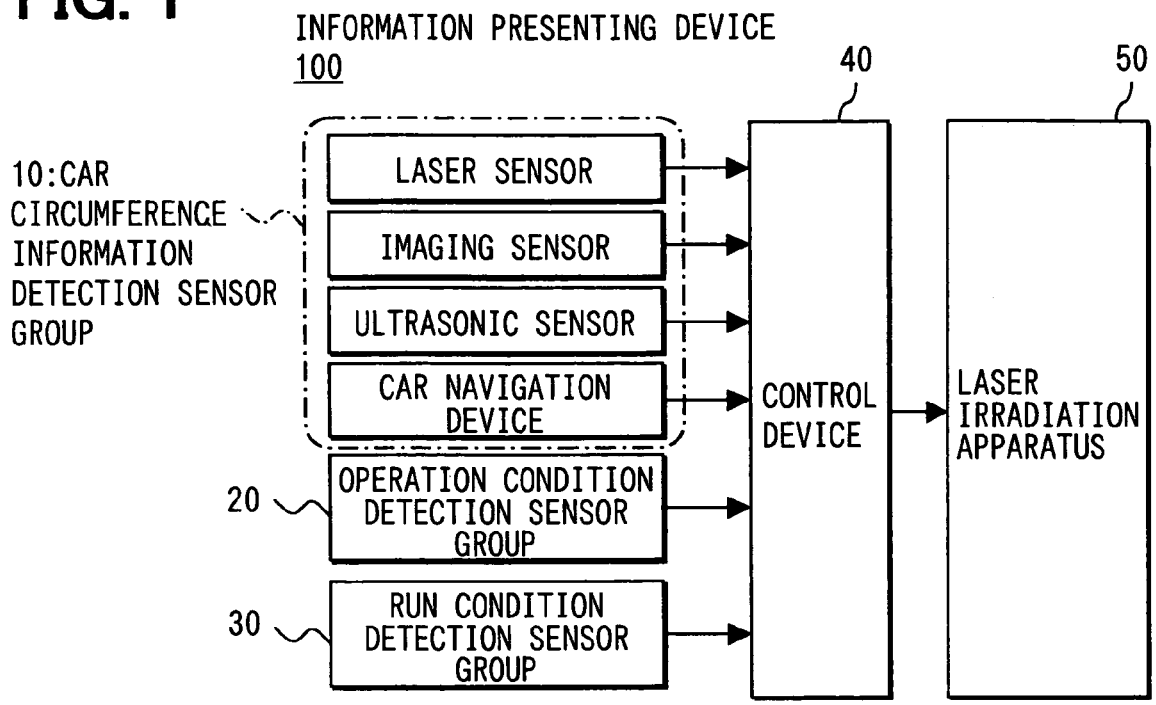
FIG. 1 is a block diagram illustrating an information presenting apparatus in accordance with an example embodiment of the present invention.

An information presenting apparatus for a vehicle in accordance with an example embodiment of the present invention is shown in FIG. 1. As shown in FIG. 1, the information presenting device 100 for a vehicle may include a car circumference information detection sensor group 10, an operation condition detection sensor group 20, a run condition detection sensor group 30, a control device 40, and/or a laser irradiation apparatus 50.

In an example embodiment of the present invention, the car circumference information detection sensor group 10 may include a laser sensor, an imaging sensor, an ultrasonic sensor, and/or a car navigation device. An output from one or more of the above sensors may be processed in the control device 40.

In an example embodiment of the present invention, the control device 40 may detect characteristics of the object, for example, the type of object, a moving direction of the object (if any), a relative velocity (if any), and/or a size. In an example embodiment of the present invention, the object may be a lane boundary (for example, a white line, yellow line, a median strip), another vehicle (for example, a passenger car, a truck, a bus, a motorcycle), a pedestrian, a traffic control machine, a road sign, and a road surface. In an example embodiment of the present invention, the object may be anywhere near the perimeter of the vehicle (for example, in front, to either side, or behind).

In an example embodiment of the present invention, a sensor, for example, a laser sensor may irradiate a laser beam in a desired range of the front, side, and/or back of the vehicle, used to determine distance, relative velocity, and/or a direction, of an object which reflects the laser beam. A measurement result from the sensor may be converted into an electric signal, which may be input to the control device 40.

In an example embodiment of the present invention, an imaging sensor may be used as an imaging device to capture images (for example, photographs) of the front, side, and/or back of the vehicle. In an example embodiment, the imaging sensor may include an optical camera. The imaging sensor may be used to detect the object (for example, a lane boundary, another vehicle, a pedestrian, a traffic control machine, a road sign, a road surface, etc. as mentioned above), the size of the object, the condition of the object (for example, if the object is a traffic control machine, the lamplight color of a signal), etc. based on the image. The information collected regarding the detected object may be output to the control device 40.

In an example embodiment of the present invention, an emitting sensor, for example, an ultrasonic, microwave, or other emitting sensor, may emit a wave near the perimeter of the vehicle (for example, in front, to either side, or behind). The emitting sensor may be used to detect the distance from the vehicle to the object based on the reflected emission. The collected distance information for the detected object may be output to the control device 40.

In an example embodiment of the present invention, a car navigation device may be used to display a map showing a current position of the vehicle. The car navigation device may also be used to search for an optimal path to a destination, as well as, routing information to travel the optimal path.

In an example embodiment of the present invention, the car navigation device may be provided with memory storage to store map data. The map data may include road data further including road information (for example, road signs, traffic control machines, building locations, etc.). In an example embodiment of the present invention, the road data may also include a location, a type, a shape, etc. of a traffic control machine, a crossing, and pedestrian crossing, and a type or position of a road sign, for example.

In an example embodiment of the present invention, the car navigation device may determine the current position of the vehicle. The car navigation device may output a street address and a distance to a structure which are within a prescribed distance of the direction of movement of the vehicle to the control device 40. The structure may be a road sign or a traffic control machine.

In an example embodiment of the present invention, the operation condition detection sensor group 20 may include one or more sensors of various types, for example, a throttle sensor, a brake sensor, a steering sensor, a shift condition detection sensor, and/or a blinker condition detection sensor.

A detection signal from one or more of these sensors may be output to the control device 40.

A throttle sensor may detect a degree to which the throttle is open according to operation of an accelerator. A brake sensor may detect a degree of treading strength when braking via a brake pedal. A steering sensor may detect a steering operation direction, a degree of rotation angle from a neutral position, etc. A shift condition detection sensor may detect a position (shift position) of a gearbox. A blinker condition detection sensor may detect a blinker direction (right or left).

In an example embodiment of the present invention, a run condition detection sensor group 30 may include one or more sensors of various types, for example, a vehicle speed sensor, an acceleration sensor, a yaw-rate sensor, a tire portion angle sensor, and/or a wheel load sensor. A detection signal from one or more of these sensors may be output to the control device 40.

A vehicle speed sensor may include one or more wheel speed sensors. An acceleration sensor may detect right and left acceleration in up and/or down directions. A yaw-rate sensor may detect changes of an inertia moment of the vehicle. A tire portion angle sensor may detect the tire portion angle over an angle in a "going-straight condition" of the tires. The tires may be changed with a rotation operation of the steering wheel. The above-mentioned steering sensor may replace a tire portion angle sensor. A wheel load sensor may detect a load in an up and/or down direction of the vehicle.

Figure 2:
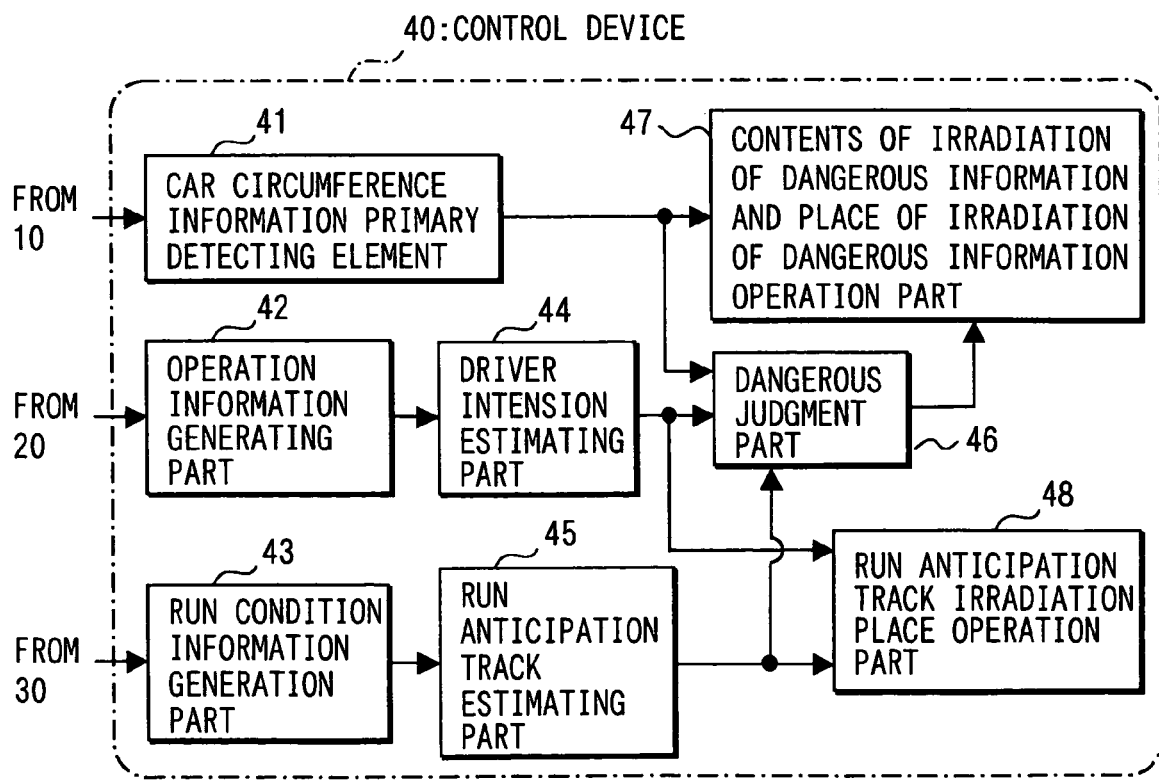
FIG. 2 is a block diagram of the control device 40 of FIG. 1.

FIG. 2 illustrates a block diagram of a control device 40, in an example embodiment of the present invention. The control device 40 may be implemented as a microcomputer including, for example, a CPU, RAM, ROM and/or an input/output (I/O) interface.

As shown in FIG. 2, the functionality of the control device 40 may be divided into a car circumference information primary detecting element 41, an operation information generating part 42, a run condition information generation part 43, a driver intention estimating part 44, a run anticipation track estimating part 45, a dangerous judgment part 46, a contents of irradiation of dangerous information and a place of irradiation of dangerous information operation part 47, and/or a run anticipation track irradiation place operation part 48.

The car circumference information primary detecting element 41 may receive and synthesize the various information output from the car circumference information detection sensor group 10. The car circumference information primary detecting element 41 may detect the types of objects, for example, another car, a truck, a two-wheeled vehicle, a pedestrian, a traffic control machine, a road sign, and/or a lane boundary which is present near the circumference of the vehicle, as well as, a position, moving direction, relative velocity, a size, of the objects. Detection information synthesized by the car circumference information primary detecting element may be output to the dangerous judgment part 46, and the contents of irradiation of dangerous information and a place of irradiation of dangerous information operation part 47.

The operation information generating part 42 may generate operation information which defines the operation condition of the driver of the vehicle based on a detection result received from the operation condition detection sensor group 20. The generated operation information may be output to the driver intention estimating part 44.

The driver intention estimating part 44 may be used to predict the intent of the driver of the vehicle based on the operation information from the operation information generating part 42. The intent may include, for example, start, acceleration, a lane change, a right and left chip box, a slow-down, and a stop. Driver intention information generated by the driver intentions estimating part 44 may be output to the dangerous judgment part 46 and the run anticipation track irradiation place operation part 48.

The run condition information generation part 43 may generate run condition information which represents the run condition of the vehicle based on detection information from the run condition detection sensor group 30. The run condition information generation part 43 may output run condition information to the run anticipation track estimating part 45.

The run anticipation track estimating part 45 may be used to predict a run anticipation track of the vehicle based on the above-mentioned run condition information. For example, the detection information from the run condition detection sensor group 30 may be applied to a movement model set up in advance. Using the movement model, the run anticipation track estimating part 45 may predict a run anticipation track. Information on the predicted run anticipation track may be output to the dangerous judgment part 46 and the run anticipation track irradiation place operation part 48.

The dangerous judgment part 46 may determine whether the vehicle is dangerously approaching an object, for example, another car, a passenger car, a truck, a two-wheeled vehicle, a pedestrian, etc., near the circumference of the vehicle, based on the car circumference information from the car circumference information primary detecting element 41. The dangerous judgment part 46 may determine whether to stop the vehicle based on structures on the street, for example, a traffic control machine, a road sign, etc. Stop instructions may be output by the dangerous judgment part 46 in response to a lit or blinking red signal or a stop sign. The degree of danger the vehicle is in may be determined based on a relative relationship with the detected object.

When the dangerous judgment part 46 determines that the vehicle may be in danger as a result of the object and stop directions have been generated by the dangerous judgment part 46, the dangerous information, which may include a danger degree, a relative position, etc., may be generated. The dangerous information may be output to the contents of irradiation of dangerous information and a place of irradiation of dangerous information operation part 47.

The dangerous judgment part 46 may determine the danger based on the driver intention information from the driver intention information estimating part 44 and the run anticipation track information from the run anticipation track estimating part 45. For example, the danger to the vehicle as a result of the object may change based on the driver's intention and the run anticipation track. Stop directions may also. Therefore, a more accurate judgment may obtained based on a run anticipation track, a driver's intention, etc.

The dangerous judgment part 46 may determine the dangerous information at least based on the driver intention information from the driver intention estimating part 44 and the run anticipation track information from the run anticipation track estimating part 45.

The run anticipation track irradiation place operation part 48 may calculate a future location of the vehicle (for example, 3 seconds from the current location of the vehicle) and irradiate that location until that location is reached by the vehicle. The irradiation place information on the run anticipation track may be output to an irradiation apparatus, for example, laser irradiation apparatus 50.

Figure 4:
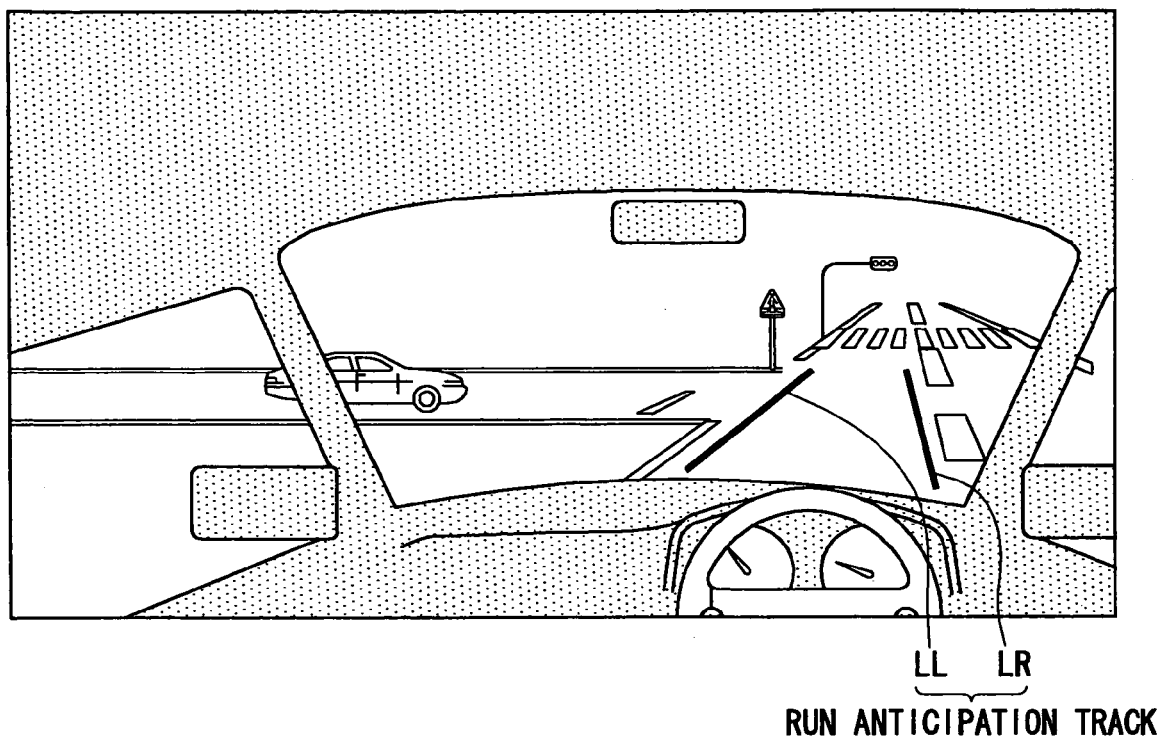
FIG. 4 illustrates a display of a run anticipation track of a vehicle in accordance with an example embodiment of the present invention.

In an example embodiment, as shown in FIG. 4, a run anticipation track defined by visible information LL and LR may be irradiated from a laser irradiation apparatus 50 in a direction of movement of the vehicle. Therefore, a driver of the vehicle can follow the run anticipation track.

It may be difficult for a driver to maintain his look direction and/or attentiveness. In example embodiments of the present invention, the run anticipation track irradiation place operation part 48 may change the type of irradiation, the presentation of the visible information, or the irradiation direction of a run anticipation track, length, and/or shape according to the run condition generated by the run condition information generation part 43. Such changes may increase the vehicle driver's of the attentiveness, so that important information is not overlooked.

When dangerous information is output from the dangerous judgment part 46, the contents of irradiation of dangerous information and a place of irradiation of dangerous information operation part 47 may calculate the location (a position, direction, etc.) of the dangerous object so that the run anticipation track LL and LR, which was being irradiated until the dangerous object was detected, may be moved in a direction of the dangerous object, based on the dangerous information. The contents of irradiation of dangerous information and the place of irradiation of dangerous information operation part 47 may calculate irradiation information so that new vision information pertaining to the dangerous object may be displayed.

Figure 5:
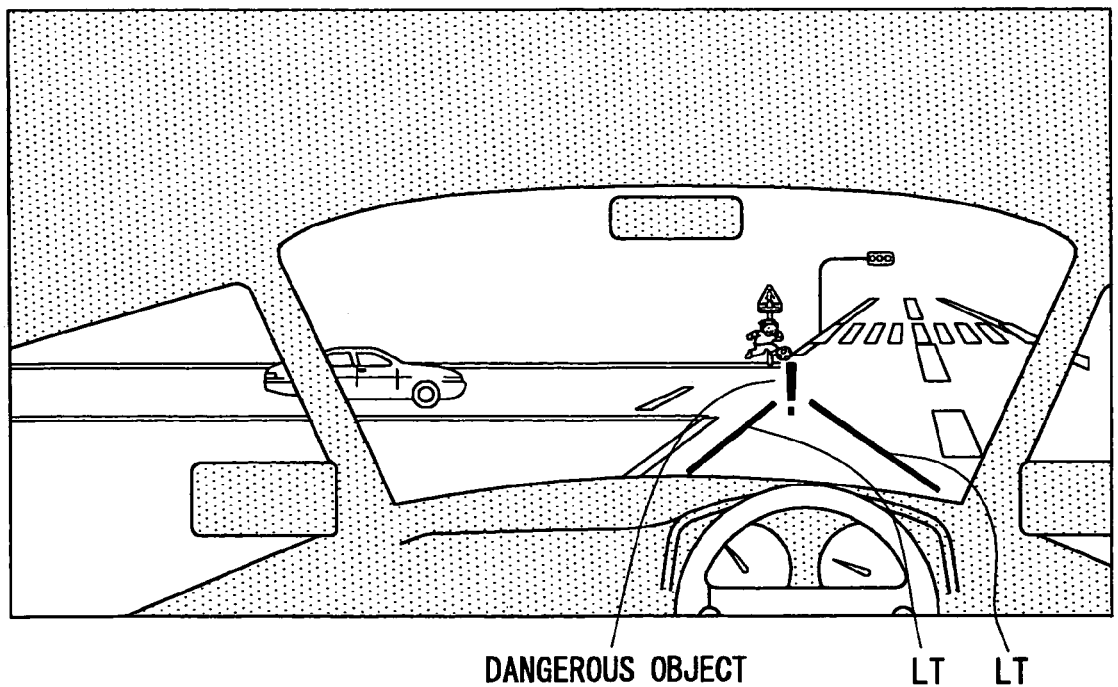
FIG. 5 illustrates a display of a dangerous object in accordance with an example embodiment of the present invention.

For example, as shown in FIG. 5 in the case of multiple dangerous objects, for example, another car and a pedestrian, vision information represented by the "!" mark is irradiated in the direction of the pedestrian. The vision information directs the driver's attention to the pedestrian.

The laser irradiation apparatus 50 shown in FIG. 1 may irradiates the vision information shown with laser beams. Therefore, a driver can visually recognize the vision information, and therefore also, the pedestrian.

As described above, the laser irradiation apparatus 50 operation may be controlled by control device 40. For example, when the dangerous judgment part 46 determines that no dangerous object is present, the run anticipation track LL and LR, displayed as vision information are irradiated in a direction of movement of the vehicle during operation. As a result, the driver's attention is directed to look in the direction of movement of the vehicle and the focus of the driver's vision is to a position where the vision information is shown.

When the dangerous judgment part 46 determines that a potentially dangerous object exists in the vicinity of the vehicles, the direction of radiation of the vision information may be moved to a direction of the dangerous object.

As shown in FIG. 5, vision information which shows the run anticipation track LL and LR may be changed to dangerous information LT which shows the direction of the dangerous object. As a result, the driver who is looking in the direction of movement of the vehicle can notice the change of the direction of the vision information. As a result, the driver can react to movement of the direction of the vision information immediately. For this reason, a delay of look movement to a dangerous object may be controlled and oversight of a dangerous object can decreased.

When the direction of vision information moves in the direction in which a dangerous object exists from the direction of movement of the vehicle, the focus of the driver's vision shifts to a position where the dangerous object exists from the position of the run anticipation track LL and LR, which shows the direction of movement of the vehicle. Therefore, the driver need only make a smaller focal adjustment compared with the prior art, where the driver's look moves from the windshield to the dangerous object.

As a result, information presenting devices in accordance with example embodiments of the present invention may shorten the delay of look movement to a dangerous object. As a result, oversight of a dangerous subject may also be reduced. Additionally, the degree of focal adjustment a driver's vision may be made smaller. As a result, a driver may more easily recognize a dangerous object.

Figure 3:
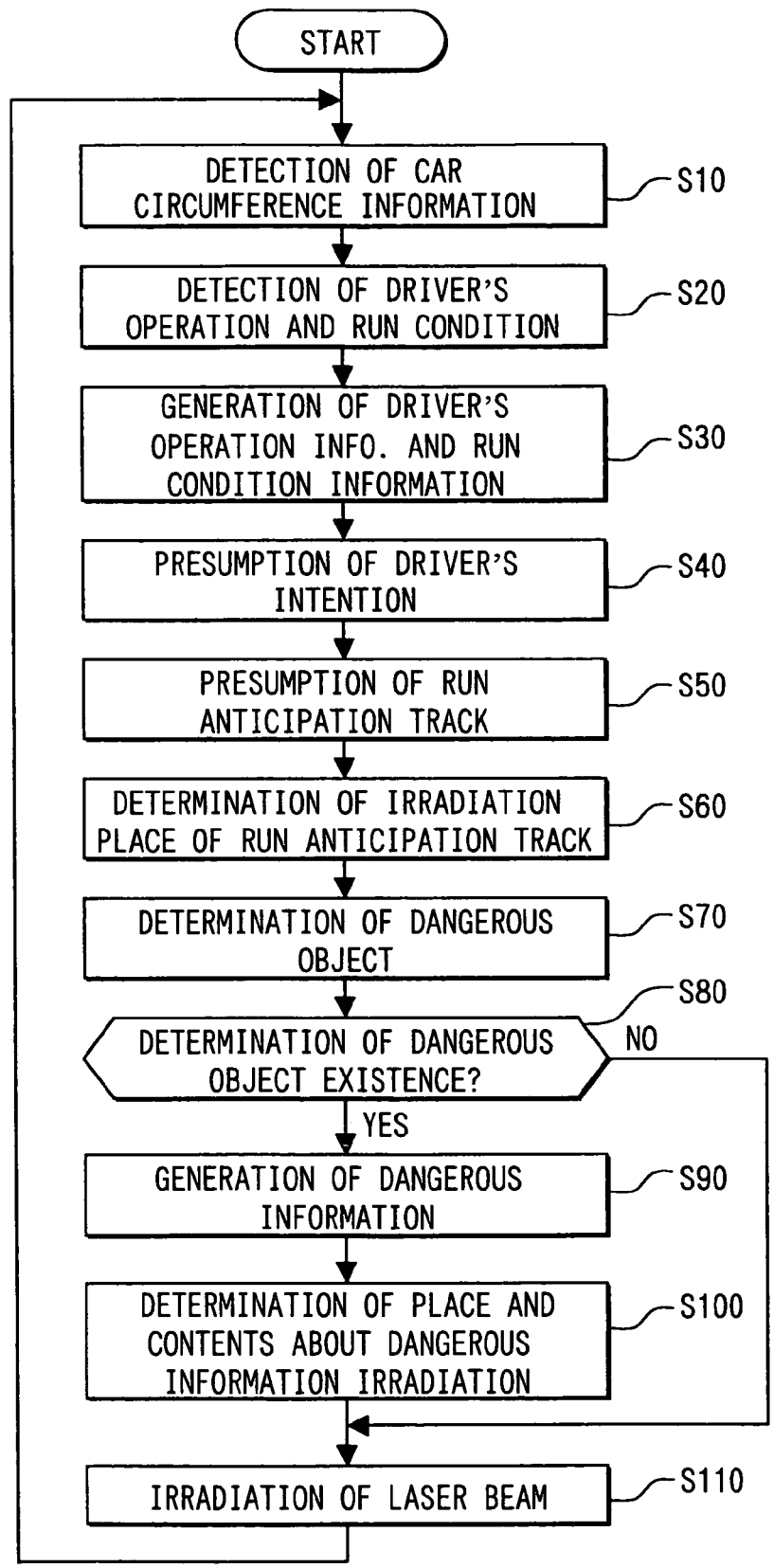
FIG. 3 is a flow chart illustrating an information presenting method in accordance with an example embodiment of the present invention.

A laser irradiation control process in accordance with example embodiments of the present invention is illustrated in the flow chart shown in FIG. 3. At S10, car circumference information may be detected. At S20, detection of a driver operating condition and a run condition may be performed.

At S30, operation information and run condition information may be generated from the driver operating condition detected in S20 and a run condition. At S40, a driver's intention is predicted based on operation information. At S50, a run anticipation track is predicted based on run condition information.

The irradiation location of a run anticipation track is determined at S60. At S70, it is determined whether potentially dangerous objects are approaching the vehicle, for example, other cars, such as a passenger car, a truck, and/or a two-wheeled vehicle, and a pedestrian. At S70, it is also determined whether any structures on the street, traffic control machines, and/or a road sign are nearby which may cause the vehicle to have to stop or slow down.

At S80, it is determined whether a dangerous object is nearby. When an affirmative determination is made, dangerous information is generated at S90 and at S100, the contents of irradiation and the place of dangerous information are determined. On the other hand, when a negative determination is made at S80, flow progresses to S110.

At S110, when no dangerous object is determined to be present as a result of the determination in S80, a run anticipation track LL and LR may be displayed as vision information showing the direction of movement of the vehicle. On the other hand, when a dangerous object is determined to be present as a result of the determination in S80, the run anticipation track LL and LR are moved in a direction in which the dangerous object is located.

As described, an information presenting device for a vehicle in accordance with an example embodiment of the invention may continuously irradiate the run anticipation track LL and LR as visible information in the direction of movement of the vehicle during vehicle operation. When a dangerous object is present, the direction of the vision information may be moved from the direction of movement of the vehicle to the direction of a dangerous object.

As a result, a driver can react to a change in the direction of vision information more quickly. For this reason, a delay in looking to a dangerous object may be controlled and oversight of a dangerous object can be reduced.

The present invention is not limited to the example embodiments set forth above and many variations of the example embodiments are contemplated. For example, there are various applications outlined below using an information presenting device 100 in accordance with example embodiments of the present invention.

For example, when the vehicle is likely to deviate from the lane in which it is in, vision information may be displayed showing the position of the road lane (for example, reflectors, or yellow or white painted lines) which designate the boundary of the lane. As a result, when a lane deviation is likely to occur, the driver can be warned.

Also, a look monitoring instrument may be implemented with the example embodiments of the present invention. When the driver is looking in another direction, vision information may irradiate arbitrary points on the look which is looking the other way point. Thereby, movement of a driver's look in a suitable direction can be urged on operation.

In an example embodiment, the control device 40 may obtain direction information for the driver to operate the vehicle. The control device 40 may irradiate the direction as vision information. Therefore, the information presenting device 100 may provide the driver with direction information via vision information.

In an example embodiment, the information presenting device 100 may also irradiates vision information to another car so that the other car may acquire information about the vehicle.

Even if vision information does not correspond to a dangerous object, the information presenting device 100 may irradiate vision information to an object, for example, a pedestrian in front of the vehicle. As a result, the pedestrian may be made aware of the approaching vehicle of self-car, regardless of day or night.

After the degree of rotation angle of a steering or blinker is detected, the information presenting device 100 may irradiate vision information which shows the intent of the vehicle to change lanes. Therefore, the intent to change lanes can be conveyed to another car, for example another car which is in either lane.

What is claimed is:

1. An information presenting apparatus for a vehicle comprising:
    a presentation device to present display information toward areas outside the vehicle, the display information being generated by at least one laser beam;
    a control device to control a presentation direction of said presentation device so that the display information relates to a travel direction of the vehicle during operation;
    an object sensing device to detect an object near the vehicle; and
    a determining device to determine whether the object is a dangerous object;
    said control device moving the presentation direction from the travel direction of the vehicle to a direction of the object, to allow the presentation device to present display information about the object, if the determining device determines that the object is a dangerous object.

2. The information presenting apparatus according to claim 1, further comprising:
    a run condition sensing device to detect a run condition of the vehicle; and
    a run anticipation track estimating device to estimate a run anticipation track of the vehicle based on the run condition detected by the run condition sensing device;
    said control device controlling the presentation device to present display information related to the run anticipation track.

3. The information presenting apparatus according to claim 2, said control device changing at least one shape of presentation about the presentation direction of said run anticipation track, length, and mode, according to a run condition which said run condition sensing device detected.

4. The information presenting apparatus according to claim 2, further comprising:
    an operation condition sensing device to detect an operating condition of a driver of the vehicle;
    a driver intention estimating device to predict a driver's intention based on the operating condition detected by the operation condition sensing device;
    said determining device judging based on either said run anticipation track or said driver's intention, whether the object is a dangerous object based on the object detected by the object sensing device.

5. The information presenting apparatus for a car according to claim 1, wherein
    the object is at least one of another vehicle, a pedestrian, a traffic control machine, a road sign, and a lane boundary,
    said presentation device presenting different display information depending on the type of object.

6. An information presenting method for a vehicle, comprising:
    presenting display information toward areas outside the vehicle, the display information being generated by at least one laser beam;
    detecting an object near the vehicle;
    determining whether the object is a dangerous object;
    moving the presentation direction from a travel direction of the vehicle to a direction of the object, to allow the presentation device to present display information about the object, if the determining device determines that the object is a dangerous object; and
    controlling the presentation direction so that the display information illustrates a direction of movement of the vehicle during operation, and if the object is a dangerous object, moving the presentation direction from the direction of movement of the vehicle to a direction of the object.

7. An information presenting method for a vehicle, comprising:
    processing display information based on a predicted direction of movement of the vehicle;
    detecting an object near the vehicle;
    determining whether the object is a dangerous object;
    controlling a presentation direction so that the display information is a direction of movement of the vehicle during operation, and if the object is a dangerous object, moving the presentation direction from the direction of movement of the vehicle to a direction of the object; and
    presenting the display information toward areas outside the vehicle, the display information being generated by at least one laser beam.

8. A control device for an information presenting apparatus of a vehicle comprising:
    an input device to receive a plurality of inputs, including at least one surrounding vehicle input, at least one operating condition input, and at least one run condition input; and
    a processor to detect an object near the vehicle, determine driver intention and determine a run anticipation track of the vehicle based on the at least one surrounding vehicle input, the at least one operating condition input, and the at least one run condition input;
    said processor also to determine if the object is a dangerous object based on the object detected near the vehicle and the driver intention, and to output the run anticipation track of the vehicle, if the object near the vehicle is not a dangerous object, and to output information which identifies the direction of the object, if the object near the vehicle is a dangerous object, said processor also to output display information for presentation toward areas outside of the vehicle, the display information being generated by at least one laser beam.

9. The information presenting apparatus according to claim 1, wherein
    if the display information generated by the laser beam is directly radiated in the direction of the object outside of the vehicle the determining device determines that the object is a dangerous object.

10. The information presenting apparatus according to claim 1, further comprising a laser sensor that irradiates a laser beam in a desired range in at least one of a front, side and back of the vehicle.

11. The information presenting apparatus according to claim 1, wherein the laser beam is irradiated from a laser irradiation apparatus in a direction of movement of the vehicle.

12. The information presenting apparatus according to claim 11, wherein the laser beam defines an anticipation track as visible information.

* * * * *